US010239304B2

(12) United States Patent
Van Voast et al.

(10) Patent No.: US 10,239,304 B2
(45) Date of Patent: Mar. 26, 2019

(54) COMPOSITE STRUCTURE AND METHOD FOR INSPECTING A PRE-BOND SURFACE OF A COMPOSITE STRUCTURE

(71) Applicant: The Boeing Company, Chicago, IL (US)

(72) Inventors: Peter J. Van Voast, Seattle, WA (US); Marcus A. Belcher, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 10 days.

(21) Appl. No.: 15/681,799

(22) Filed: Aug. 21, 2017

(65) Prior Publication Data
US 2017/0348958 A1 Dec. 7, 2017

Related U.S. Application Data

(62) Division of application No. 14/215,396, filed on Mar. 17, 2014, now abandoned.

(51) Int. Cl.
B32B 41/00 (2006.01)
B29C 65/00 (2006.01)
(Continued)

(52) U.S. Cl.
CPC .......... *B32B 41/00* (2013.01); *B29C 66/0224* (2013.01); *B29C 66/0246* (2013.01);
(Continued)

(58) Field of Classification Search
USPC .... 156/64, 67, 230, 237, 239, 240, 247, 277
See application file for complete search history.

(56) References Cited

U.S. PATENT DOCUMENTS 4,783,362 A 11/1988 Thornton et al.
5,316,857 A * 5/1994 Spiegel ................. B65D 65/40
156/64
(Continued)

FOREIGN PATENT DOCUMENTS

JP 2 501396 5/1996
JP 2002 129138 5/2002
(Continued)

OTHER PUBLICATIONS

The State Intellectual Property Office of the People's Republic of China, "Notification of the Second Office Action," with English translation, App. No. 2015100191978 (dated Jul. 12, 2018).
(Continued)

Primary Examiner — Sing P Chan
(74) Attorney, Agent, or Firm — Walters & Wasylyna LLC

(57) ABSTRACT

A method for preparing a pre-bond surface of a composite structure includes the steps of: (1) separating a peel ply, co-cured with a composite substrate, from the composite substrate; and (2) transferring an identifiable marking agent from the peel ply to the composite substrate upon separation of the peel ply from the composite substrate. Residue of the peel ply, transferred from the peel ply to the composite substrate upon separation of the peel ply from the composite substrate, is layered on the identifiable marking agent.

20 Claims, 9 Drawing Sheets

(51) Int. Cl.
   *B29C 70/54*    (2006.01)
   *D06M 15/70*    (2006.01)
   *C09D 11/10*    (2014.01)
   *B29K 105/00*   (2006.01)

(52) U.S. Cl.
   CPC ............ *B29C 66/721* (2013.01); *B29C 70/54* (2013.01); *C09D 11/10* (2013.01); *D06M 15/70* (2013.01); *B29C 66/71* (2013.01); *B29C 66/7212* (2013.01); *B29C 66/72141* (2013.01); *B29C 66/72143* (2013.01); *B29C 66/7392* (2013.01); *B29C 66/7394* (2013.01); *B29C 66/73161* (2013.01); *B29C 66/73751* (2013.01); *B29C 66/73753* (2013.01); *B29K 2105/0079* (2013.01); *B32B 2605/18* (2013.01); *Y10T 428/24802* (2015.01)

(56) References Cited

U.S. PATENT DOCUMENTS

| | | | |
|---|---|---|---|
| 6,645,610 B1 | 11/2003 | Reis et al. | |
| 6,836,215 B1* | 12/2004 | Laurash | G06K 1/12 156/60 |
| 7,959,753 B2* | 6/2011 | Nunez Delgado | B29C 70/446 156/245 |
| 8,168,027 B2* | 5/2012 | Jacobsen | B29C 37/0082 156/247 |
| 8,293,830 B2* | 10/2012 | Clarke | B32B 27/04 427/554 |
| 8,309,213 B2* | 11/2012 | Clarke | C04B 35/571 428/292.1 |
| 8,329,085 B2* | 12/2012 | Kurtz | B29C 33/68 264/258 |
| 8,821,667 B2* | 9/2014 | Sneddon | B29C 70/86 156/169 |
| 9,126,355 B2* | 9/2015 | Welch | B29C 33/308 |
| 9,254,622 B2* | 2/2016 | Flinn | B32B 3/263 |
| 9,473,459 B2* | 10/2016 | Zhao | H04W 76/10 |
| 10,093,081 B2* | 10/2018 | Zhao | B29C 70/54 |
| 2006/0097426 A1 | 5/2006 | Luepke et al. | |
| 2006/0102847 A1 | 5/2006 | Shelley et al. | |
| 2010/0304152 A1* | 12/2010 | Clarke | B32B 5/26 428/438 |
| 2010/0324187 A1* | 12/2010 | Clarke | B32B 27/04 524/405 |
| 2012/0034428 A1* | 2/2012 | Clarke | C04B 35/571 428/193 |
| 2013/0045349 A1 | 2/2013 | Kronzer et al. | |
| 2013/0280488 A1 | 10/2013 | Flinn | |
| 2015/0258765 A1* | 9/2015 | Van Voast | B32B 41/00 156/64 |
| 2015/0323292 A1* | 11/2015 | Strauss | F41H 5/0485 89/36.02 |
| 2015/0343737 A1* | 12/2015 | Strauss | B30B 5/02 428/69 |
| 2015/0343738 A1* | 12/2015 | Strauss | B30B 5/02 428/69 |
| 2016/0176174 A1* | 6/2016 | Strauss | B30B 5/02 156/286 |
| 2017/0182684 A1* | 6/2017 | Garhart | B29C 37/00 |
| 2017/0348958 A1* | 12/2017 | Van Voast | B32B 41/00 |
| 2018/0222135 A1* | 8/2018 | Dias Borges Vianna | B29C 70/885 |

FOREIGN PATENT DOCUMENTS

| | | |
|---|---|---|
| JP | 2002 356634 | 12/2002 |
| WO | WO 89/02943 | 4/1989 |

OTHER PUBLICATIONS

Federal Service for Intellectual Property (Russia), "Office Action," App. No. 2014147112/05(075841), (dated Jun. 14, 2018).
Japanese Patent Office, Office Action, JP 2015-041124 (2018).
The State Intellectual Property Office of the People's Republic of China, Notification of First Office Action, 201510019197.8 (dated Jan. 19, 2018).
Australian Patent Office, Examination report, App. No. 2014265098 (dated Dec. 18, 2018).
Hart-Smith L.J. et al: "Surface Preparations for Ensuring that the Glue Will Stick in Bonded Composite Structures," Handbook of Composites, SpringerLink, URL: https://doi.org/10.1007/978-1-4615-6389-1_30 (1998).

* cited by examiner

10,239,304 B2

COMPOSITE STRUCTURE AND METHOD FOR INSPECTING A PRE-BOND SURFACE OF A COMPOSITE STRUCTURE

PRIORITY

This application is a divisional of U.S. Ser. No. 14/215,396 filed on Mar. 17, 2014.

FIELD

The present disclosure is generally related to composite structures and, more particularly, to composite structures having improved surface bonding characteristics and methods for inspecting a pre-bond surface of a composite structure to verify sufficient surface treatment for bonding.

BACKGROUND

Composite structures have an advantageous combination of high strength and lightweight. As such, composite structures commonly find use in aerospace and other industries where such properties are beneficial. For example, the surface skins of modern aircraft may commonly be formed of composite structures.

Composite structures include reinforcing fibers impregnated with a resin matrix. Often, it may be necessary to attach the composite structure to another structure, such as a second composite structure or an internal structural support (e.g., a stiffener). The strength of the bond between composite structures may depend on the surface characteristics of the composite structure.

Commonly, the surface of the composite structure may be relatively smooth and exhibit relatively weak bonding strength and durability. As a result, methods have been developed to increase the bonding strength and durability of the surface of the composite structure. One such method is the use of a peel ply during the manufacture of a composite structure. A peel ply typically includes a sheet of dry woven fabric or a sheet of woven fabric impregnated with a resin matrix. The peel ply may be placed on an uncured surface of the composite structure. The composite structure and the peel ply are then co-cured. Once cured, the peel ply may be removed from the surface of the composite structure. Once the peel ply is removed, the surface of the composite structure may be roughened or textured.

Removal of the peel ply is intended to generate a clean surface ready for bonding. A supplementary ablation surface treatment after removal of the peel ply, such as abrasion or plasma, may be required to ensure removal of any peel ply residue that could impact bonding performance. Inspection of the pre-bond surface to verify complete removal of any residue transferred to the surface may also be required and can be expensive and/or time consuming.

Accordingly, those skilled in the art continue with research and development efforts in the field of preparing a surface of a composite structure for bonding and pre-bond surface inspection.

SUMMARY

In one embodiment, the disclosed composite structure may include a composite substrate, the composite substrate including a surface, a peel ply, the peel ply including a surface, and an identifiable marking agent, wherein the surface of the peel ply includes the identifiable marking agent, and wherein the peel ply is connected to the composite substrate such that the identifiable marking agent is in contact with the surface of the composite substrate.

In another embodiment, the disclosed peel ply structure may include a peel ply, the peel ply including a surface, and an identifiable marking agent, wherein the surface of the peel ply includes the identifiable marking agent.

In another embodiment, also disclosed is a method for inspecting a pre-bond surface of a composite structure, the method may include the steps of: (1) providing a peel ply, the peel ply including a surface, and the surface of the peel ply including an identifiable marking agent, (2) placing the peel ply on a surface of a composite substrate, wherein the surface of the peel ply is in contact with the surface of the composite substrate, (3) co-curing the peel ply and the composite substrate, (4) removing the peel ply from the composite substrate to form a modified surface of the composite substrate, (5) inspecting the composite substrate for the identifiable marking agent transferred to the modified surface, wherein the identifiable marking agent is evidence of residue transferred from the peel ply to the composite substrate, (6) ablating the modified surface to remove the identifiable marking agent and the residue and (7) subsequently re-inspecting the modified surface after the ablating step for the identifiable marking agent and verifying that the modified surface is clean of residue transferred from the peel ply to the composite substrate during the co-curing process.

In yet another embodiment, also disclosed is a method for preparing a pre-bond surface of a composite structure, the method may include the steps of: (1) separating a peel ply, co-cured with a composite substrate, from the composite substrate; and (2) transferring an identifiable marking agent from the peel ply to the composite substrate upon separation of the peel ply from the composite substrate. Residue of the peel ply, transferred from the peel ply to the composite substrate upon separation of the peel ply from the composite substrate, is layered on the identifiable marking agent.

Other embodiments of the disclosed composite structure and method for preparing a composite structure for bonding will become apparent from the following detailed description, the accompanying drawings and the appended claims.

DETAILED DESCRIPTION

Figure 1:
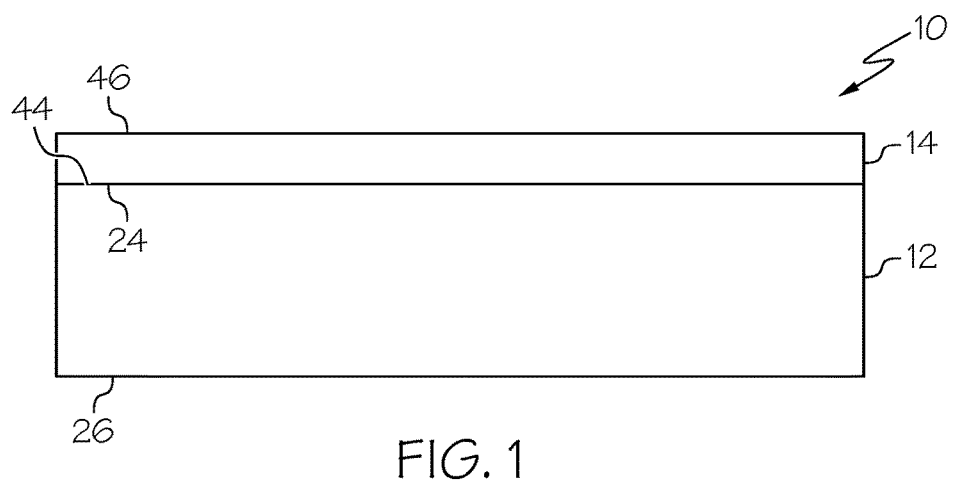
FIG. 1 is a schematic illustration of the disclosed composite structure.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed composite structure, generally designated 10, may include a composite substrate 12 and a peel ply 14. The composite substrate 12 may include opposed planar surfaces 24 and 26. The peel ply 14 may include opposed planar surfaces 44 and 46. The peel ply 14 may be applied (e.g., connected) to the composite substrate 12 such that the surface 44 of the peel ply 14 is in contact with the surface 24 (e.g., a top surface of a single layer of composite substrate or a top surface of an upper most composite substrate of a plurality of layers of composite substrate) of an uncured or partially cured composite substrate 12. The peel ply 14 together with the composite substrate 12 may be subjected to co-curing to form the composite structure 10.

Figure 2:
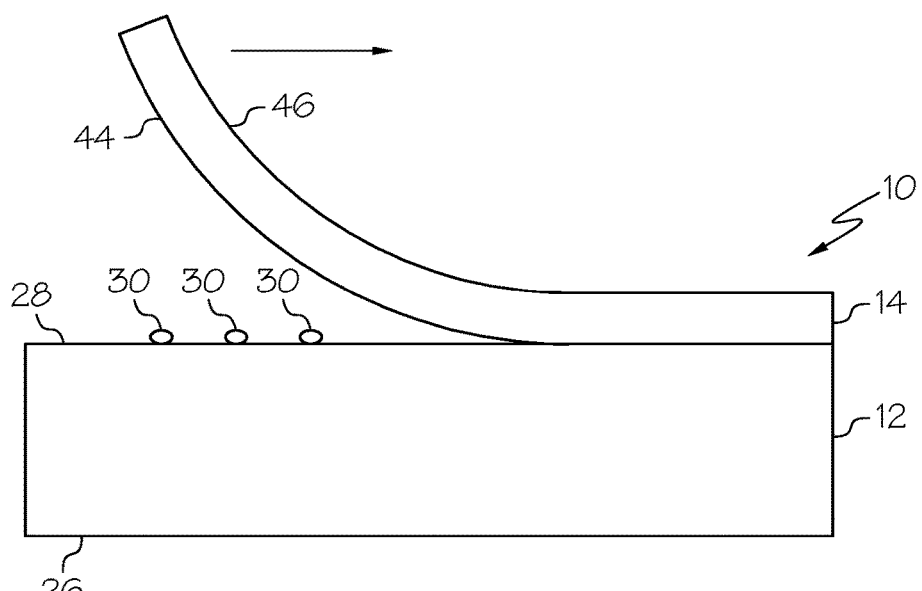
FIG. 2 is a schematic illustration of the disclosed composite structure of FIG. 1 showing the peel ply being removed from the composite substrate.

Referring to FIG. 2, once the composite substrate 12 and the peel ply 14 have been co-cured, the peel ply 14 may be removed (e.g., peeled) from the surface 24 of the composite substrate 12. The peel ply 14 may modify the surface 24 thereby forming a modified surface 28. For example, the surface 44 of the peel ply 14 may provide a modified surface 28 of the composite substrate 12 having an increased surface area, a roughened or textured surface and/or a chemically active resin ready for bonding with another structure, such as a second composite substrate (not shown). The peel ply 14 may leave residue 30 on the modified surface 28 of the composite substrate 12. For example, the residue 30 may include particles or other remnants transferred from the surface 44 of the peel ply 14 to the modified surface 28.

The characteristics of the modified surface 28 of the composite substrate 12 created by removal of the peel ply 14 may be directly influenced by how the peel ply 14 separates from the composite substrate 12. For example, a fracture line (not shown) during peeling of the peel ply 14 may be within the composite substrate 12 or at the interface between the surface 44 of the peel ply 14 and the surface 24 of the composite substrate 12, thus forming the modified surface 28.

For example, complete removal of the peel ply 14 from the surface 24 of the composite substrate 12 may modify the surface 24 of the composite substrate 12 (e.g., forming the modified surface 28) so as to facilitate and promote stronger and longer lasting bonding between the modified surface 28 of the composite substrate 12 and a second composite substrate.

As another example, incomplete removal of the peel ply 14 may transfer residue 30 on to the modified surface 28 after the peel ply 14 has been removed. The residue 30 may create weak bonds between the modified surface 28 of the composite substrate 12 and a second composite substrate. Those skilled in the art will appreciate that incomplete removal of the peel ply 14 is not uncommon.

Figure 3:
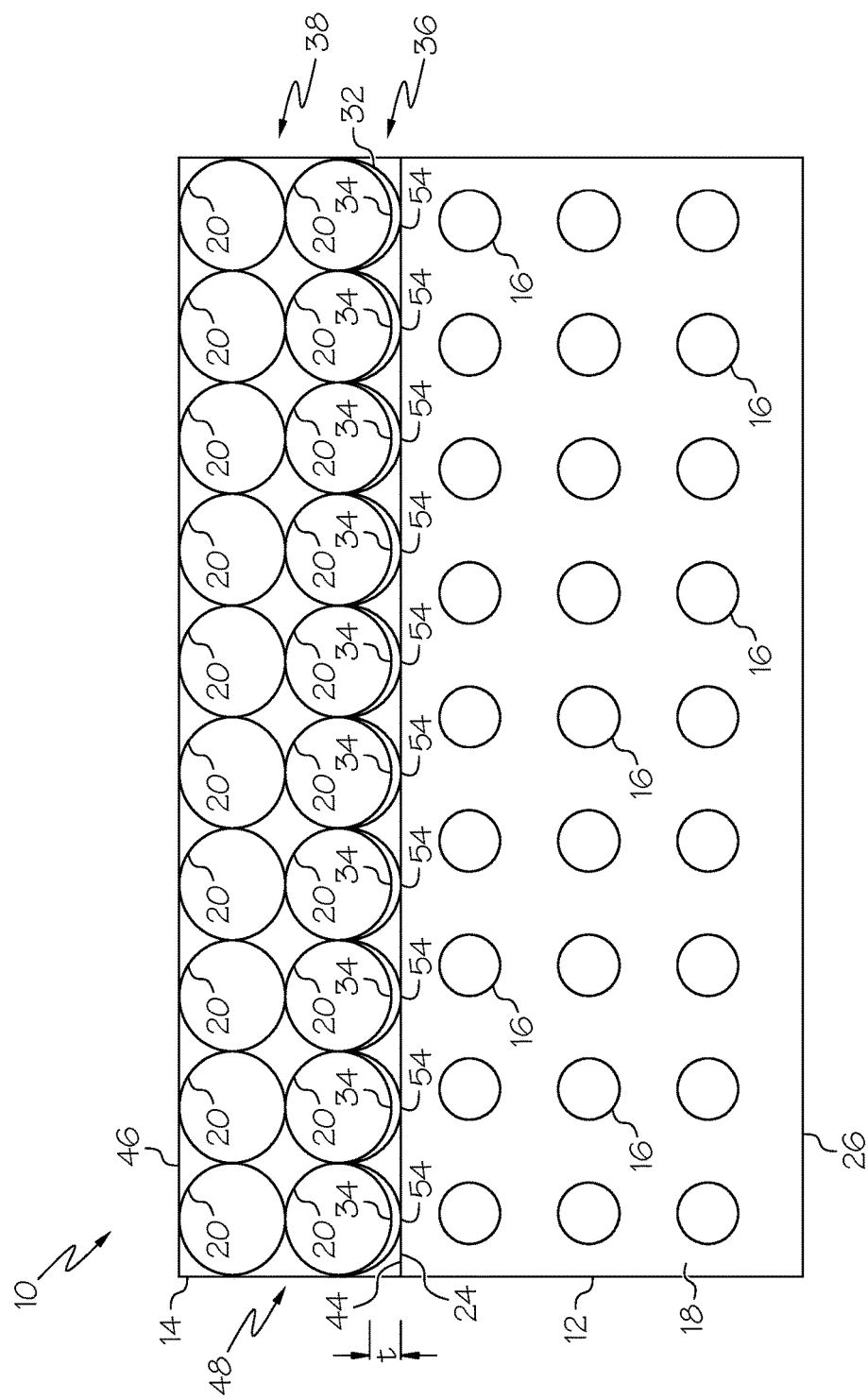
FIG. 3 is a schematic illustration of one embodiment of the disclosed composite structure.
Figure 6:
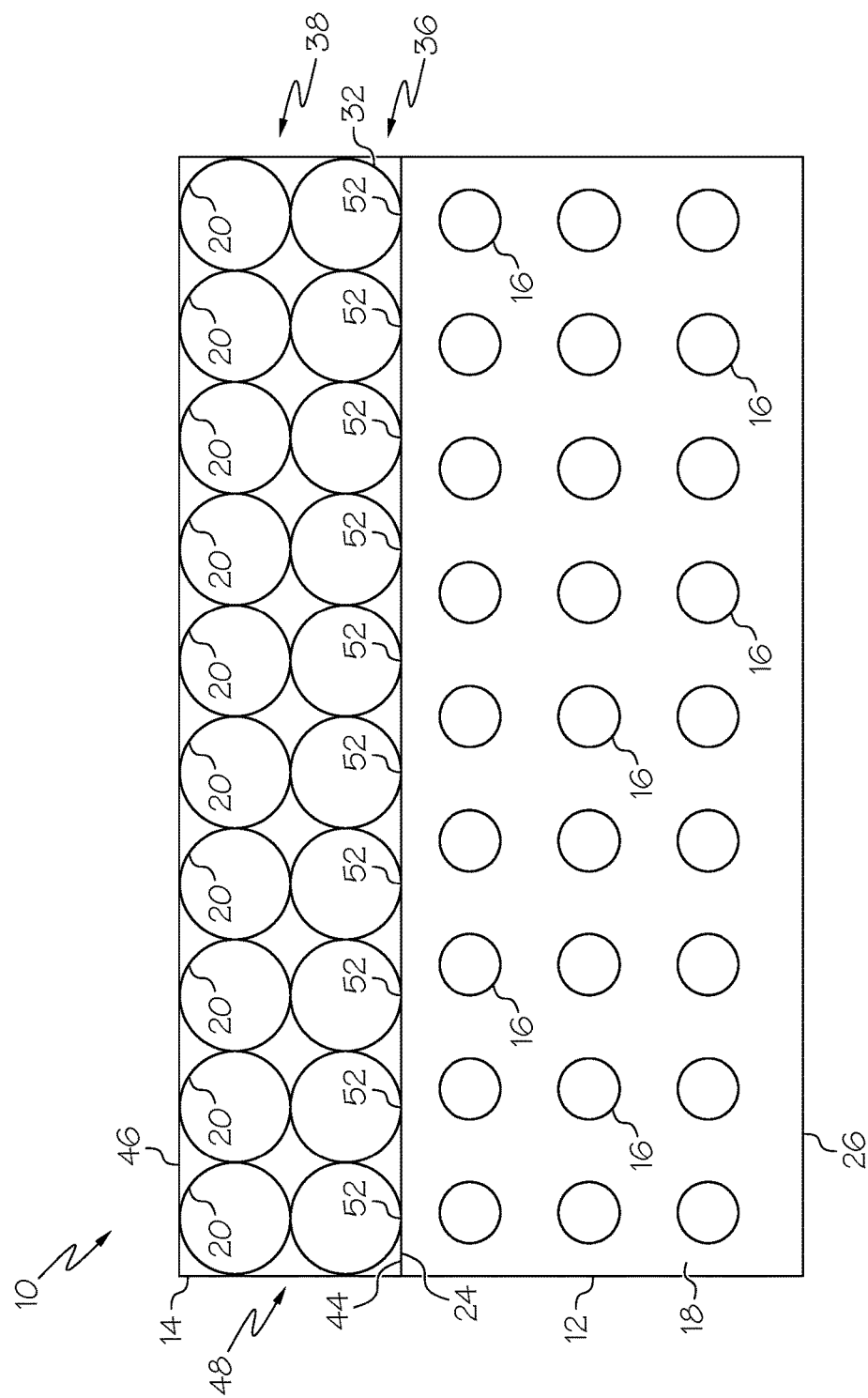
FIG. 6 is a schematic illustration of another embodiment of the disclosed composite structure.

Referring to FIGS. 3 and 6, illustrating the composite structure 10 after co-curing of the composite substrate 12 and the peel ply 14. The composite substrate 12 may include any suitable fiber-reinforced resin composite substrate (e.g., fiber-reinforced polymer). The composite substrate 12 may include fibers 16 (e.g., reinforcing fibers) embedded or impregnated in a resin matrix 18.

In an example implementation of the composite substrate 12, the resin matrix 18 may be in contact with the fibers 16 but not impregnated in the fibers 16. As another example implementation, the resin matrix 18 may be partially embedded or partially impregnated in the fibers 16. As yet another example implementation, the resin matrix 18 may be fully embedded or fully impregnated in the fibers 16.

As a specific, non-limiting example, the composite substrate 12 may include a prepreg (e.g., a single layer of composite substrate 12) or prepreg layups (e.g., a plurality of layers of composite substrate 12), such as those conventionally used in the manufacturing of structural parts in the aerospace, automotive and marine industries.

The fibers 16 may be selected from any suitable material including, but not limited to, glass (e.g., glass-reinforced polymer), carbon (e.g. carbon-fiber-reinforced polymer), graphite, and polymer fibers. Any combination of fibers 16 may be selected. The fibers 16 may be cracked (e.g., stretch-broken) fibers, discontinuous fibers, or continuous fibers. The fibers 16 may be in the form of woven, non-crimped, non-woven, unidirectional, or multiaxial textile tapes or tows (e.g., a fiber layer).

The resin matrix 18 may include any suitable polymeric resin. When cured or partially cured, the resulting resin matrix 18 may form a cross-linked matrix of polymeric resin. For example, the resin matrix 18 may include any thermosetting or thermoplastic resin.

Suitable thermoset resin materials may include, but are not limited to, phenol formaldehyde, urea-formaldehyde, 1,3,5-triazine-2,4,6-triamine (melamine), bismaleimide (BMI), epoxies, vinyl esters, benzoxazines, phenolics, polyesters, unsaturated polyesters, cyanate esters, a combination of any two or more thereof or any other suitable resin material.

Suitable thermoplastic resins materials may include, but are not limited to, polyether sulfone (PES), polyether ethersulfones (PEES), polyphenyl sulfones (PPS), polysulfones (PSU), polyesters, polymerizable macrocycles (e.g., cyclic butylene terephthalate), liquid crystal polymers, polyimides, polyetherimides (PEI), aramids, polyamides, polyketones, polyetheretherketone (PEEK), polyetherketoneketone (PEKK), polyurethanes, polyureas, polyarylethers, polyarylsulfides, polycarbonates, polyphenylene oxide (PPO) and modified PPO, a combination of any two or more thereof or any other suitable resin material.

The composite structure 10 may include at least one curing agent. For example, the curing agent may be present in the resin matrix 18 (e.g., the polymeric resin). Suitable curing agents may include, but are not limited to, cyanoguanidine, aromatic amines, aliphatic amines, acid anhydrides, Lewis acids, substituted ureas, imidazoles, hydrazines, amides, substituted amides, imines, substituted imines, hydrazides, a combination of any two or more thereof or any other suitable curing agent.

The composite substrate 12, the resin matrix 18 and/or the fibers 16 may also include additional ingredients, such as performance enhancing or modifying agents. For example, the performance enhancing or modifying agents may include, but are not limited to, flexibilizers, toughening agents or particles, accelerators, flame retardants, wetting agents, pigments or dyes, plasticizers, UV absorbers, antifungal compounds, fillers, viscosity modifiers, flow control agents, tackifiers, stabilizers, inhibitors, or any combination of two or more thereof.

Referring still to FIGS. 3 and 6, the peel ply 14 may include a fabric layer 38. Opposed surfaces of the fabric layer 38 may define the opposed planar surfaces 44 and 46 of the peel ply 14. The peel ply 14 may be a wet peel ply 14 (e.g., the fabric layer 38 is pre-impregnated with a resin matrix) or a dry peel ply 14 (e.g., the fabric layer 38 is free of a resin matrix).

The fabric layer 38 may be a woven fabric. For example, the fabric layer 38 may include a plurality of yarns 48 woven in a weaving pattern. Each yarn 48 may include a plurality of continuous fibrous filaments 20 (e.g., single fibers) twisted together. For example, each yarn 48 may include between approximately 28 to 48 filaments 20 twisted together. Only a portion of a single yarn 48 is shown in FIGS. 3-6.

The filaments 20 may be any suitable material including, but not limited to, polyesters, polyethylene terephthalate (PET), polybutylene terephthalate (PBT), polytrimethylene terephthalate (PTT), polylactic acid, polyethylene, polypropylene, nylons, elastomeric materials (e.g., LYCRA®), polyaramids (e.g., high-performance fibers), para-aramids (e.g. KEVLAR®), meta-aramids (e.g. NOMEX®), polyimides, polyetheretherketone (PEEK), glass or any other suitable material.

In an example implementation of a wet peel ply 14, the fabric layer 38 may be impregnated with a resin matrix (not shown). The resin matrix may include any suitable polymeric resin. The resin matrix of the peel ply 14 may be the same as or different from the resin matrix 18 of the composite substrate 12. As a general, non-limiting example, the resin matrix of the peel ply 14 may be a DGEBA epoxy and the resin matrix 18 of the composite substrate 12 may be another compatible epoxy resin.

During a co-curing process, the resin matrix 18 of the composite substrate 12 may impregnate with fabric layer 38 but not bond with the fabric layer 38 such that the peel ply 14 may be removed from the surface 24 of the composite substrate 12 to form the modified surface 28.

The surface 44 of the peel ply 14 may include an identifiable marking agent 32. For example, the identifiable marking agent 32 may be applied onto the surface 44 of the peel ply 14 or incorporated into the peel ply 14 (e.g., into the fabric layer 38) defining at a portion of the surface 44 of the peel ply 14. The identifiable marking agent 32 may be selected to afford high visual discernibility with respect to the peel ply 14 and/or the composite substrate 12. As an example, when the fabric layer 38 of the peel ply 14 and/or the resin matrix 18 of the composite substrate 12 are dark in color, the identifiable marking agent 32 may be light (e.g., bright) and/or contrasting in color. As another example, when the fabric layer 38 of the peel ply 14 and/or the resin matrix 18 of the composite substrate 12 are light in color, the identifiable marking agent 32 may be dark and/or contrasting in color. As still another example, the identifiable marking agent 32 may include one or more components that are chemically activated (e.g., fluorescent), mechanically activated, or light activated (e.g., UV active) prior to an ablation process, as described in more detail herein below.

Referring to FIG. 3, in an example embodiment, the identifiable marking agent 32 may be applied to the surface 44 of the peel ply 14. For example, the identifiable marking agent 32 may be applied onto at least a portion of the surface 44 of the peel ply 14 that is placed in contact with the surface 24 of the composite substrate 12. As an example, the identifiable marking agent 32 may be applied to and cover a portion of the fabric layer 38 defining the surface 44. For example, the identifiable marking agent 32 may cover at least a portion of a surface 34 of one or more filaments 20 that are in contact with the surface 24 of the composite substrate 12. Thus, an identifiable marking layer 36 may be positioned between at least a portion of the fabric layer 38 (e.g., one or more filaments 20) of the peel ply 13 and the surface 24 of the composite substrate 12.

In an example implementation, the identifiable marking agent 32 may be ink, fiber dye, or any other visible marking agent. For example, the identifiable marking agent 32 (e.g., ink) may be applied to the surface 44 of the peel ply 14 (e.g., at least a portion of the fabric layer 38 defining the surface 44) with a roller, a printer (e.g., an inkjet printer), or any other suitable application device. In a wet peel ply example, the identifiable marking agent 32 may be applied to the surface 44 of the peel ply 14 after heat setting.

As a general, non-limiting example, the identifiable marking agent 32 may be ink 54 suitable for application (e.g., printing) onto the peel ply 14. As a specific, non-limiting example, the ink 54 may be polyester resin based ink suitable for application onto a polyester peel ply. As another specific, non-limiting example, the ink 54 may be nylon resin based ink suitable for application onto a nylon peel ply.

The ink 54 (e.g., the identifiable marking agent 32) may be applied at any suitable thickness t. The thickness t may be selected to limit contamination of the modified surface 28. As an example, the ink 54 may be applied at a thickness t of between approximately 25 nm to 200 nm. As another example, the ink 54 may be applied at a thickness t of between approximately 50 nm to 150 nm. As another example, the ink 54 may be applied at a thickness t of between approximately 50 nm to 100 nm.

The surface area (e.g., of the surface 44) covered by the ink 54 (e.g., the identifiable marking agent 32) may be optimized to limit additional contamination to the modified surface 28 of the composite substrate 12. As an example, the ink 54 may cover at most 5% of the surface 44 of the peel ply 14. As another example, the ink 54 may cover at most 10% of the surface 44 of the peel ply 14. As another example, the ink 54 may cover at most 25% of the surface 44 of the peel ply 14. As another example, the ink 54 may cover at most 50% of the surface 44 of the peel ply 14. As yet another example, the ink 54 may cover 100% of the surface 44 of the peel ply 14.

Figure 4:
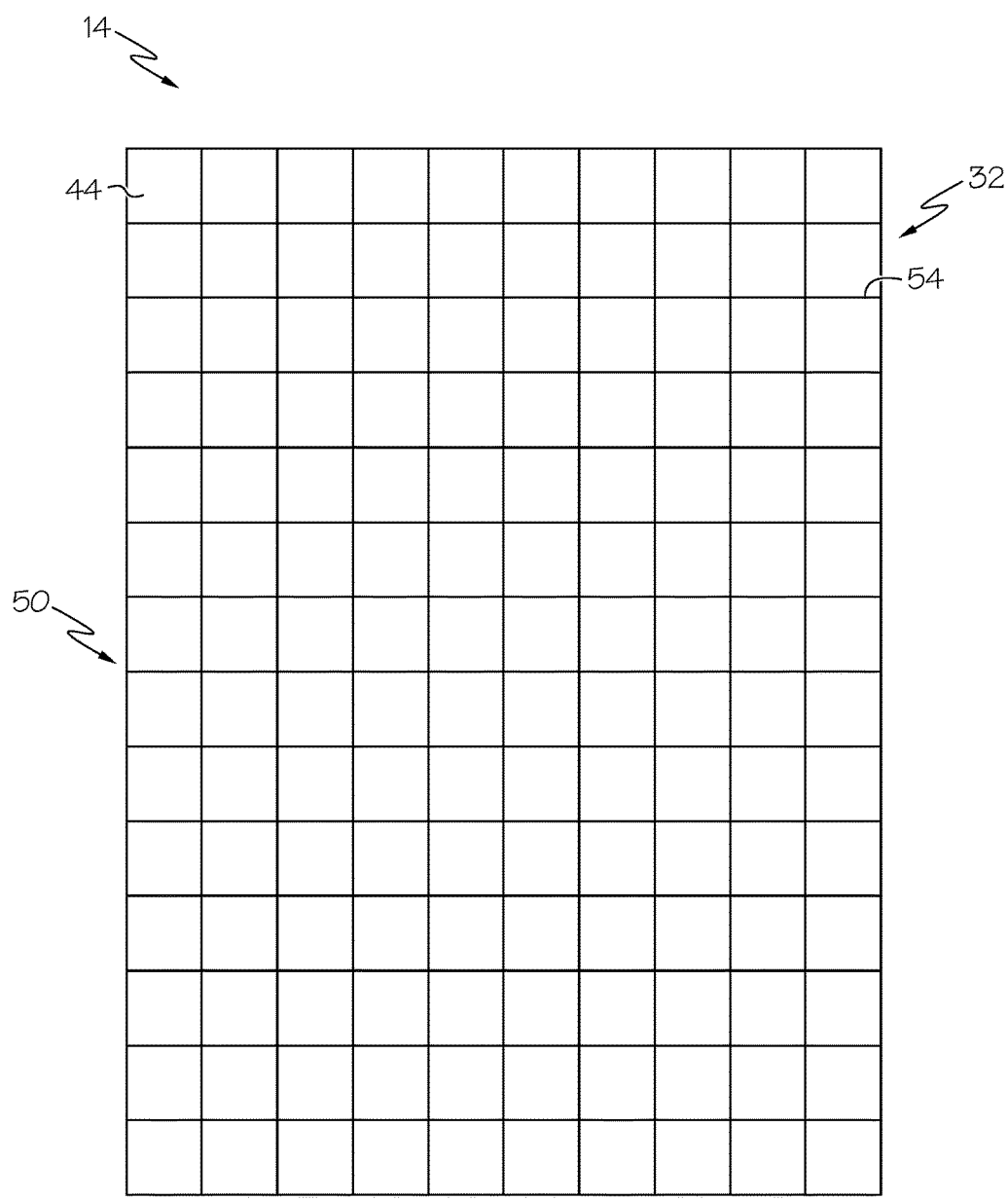
FIG. 4 is a plan view of one embodiment of the peel ply of the disclosed composite structure of FIG. 3.

Referring to FIG. 4, the ink 54 (e.g., the identifiable marking agent 32) may be applied to the surface 44 of the peel ply 14 (e.g., at least a portion of the surface 34 of one or more filaments 20) in any suitable pattern. For example, the ink 54 may be applied to the surface 44 of the peel ply 14 in a grid pattern 50 (e.g., a print array). As a specific, non-limiting example, the ink 54 may be applied to the surface 44 of the peel ply 14 in a grid pattern 50 defined by approximately 25 cm squares. Those skilled in the art will appreciate the dimensions of the squares defining the grid pattern 50 may depend upon various factors including, but not limited to, the dimensions of the peel ply 14.

Figure 5:
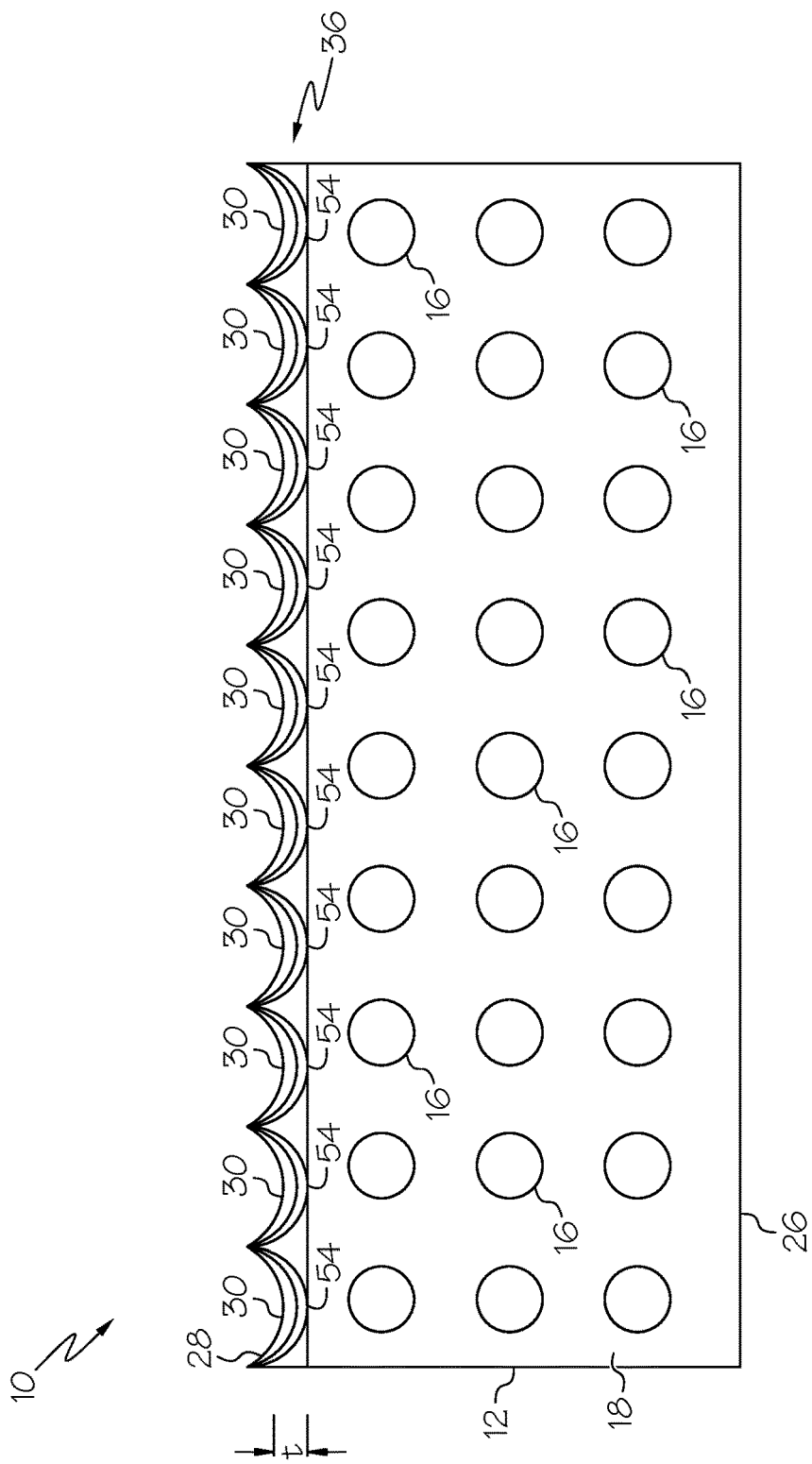
FIG. 5 is a schematic illustration of the disclosed composite structure of FIG. 3 depicting the composite substrate after removal of the peel ply.

Referring to FIG. 5, following co-curing of the composite substrate 12 and the peel ply 14 and removal of the peel ply 14 from the composite substrate 12, residue 30 from the peel ply 14 may remain on the modified surface 28 of the composite substrate 12. The residue 30 may include particles, contamination, and/or any other residue remaining (e.g., transferred) from the peel ply 14 to the modified surface 28 following removal of the peel ply 14. For example, the residue 30 may include remnants from the filaments 20 (e.g., portions of the fabric layer 38).

At least some of the identifiable marking agent 32 may also be transferred to the modified surface 28 of the composite substrate 12 along with any residue 30 upon removal of the peel ply 14. As shown in FIG. 5, the identifiable marking agent 32 is depicted as ink 54 applied to the surface 44 of the peel ply 14 (e.g., at least a portion of the surface 34 of one or more filaments 20). Following removal of the peel ply 14, any transferred residue 30 may be layered on top of the ink 54 (e.g., identifiable marking agent 32), thus the ink 54 may be positioned between the residue 30 and the modified surface 28. The ink 54 may be visible on the modified surface 28 upon removal of the peel ply 14. Inspection (e.g., visual inspection) of the modified surface 28 may readily identify the existence of any residue 30 evidenced by the existence of the ink 54 (e.g., identifiable marking agent 32) on the modified surface 28.

Referring to FIG. 6, in another example embodiment, the identifiable marking agent 32 may be incorporated into the peel ply 14 defining at least a portion of the surface 44. For example, the identifiable marking agent 32 may be a plurality of tracer filaments 52. The plurality of tracer filaments 52 and the plurality of filaments 20 may be twisted together to form at least a portion of the yarns 48 that are woven to form the fabric layer 38. The yarns 48 may be configured such that the tracer filaments 52 are disposed at the surface of the fabric layer 38 that is placed in contact with the surface 24 of the composite substrate 12 (e.g., defining at least a portion of the surface 44 of the peel ply 14). Thus, an identifiable marking layer 36 (e.g., a plurality of tracer filaments 52) may be positioned in contact with the surface 24 of the composite substrate 12 (e.g., between a portion of the fabric layer 38 and the surface 24 of the composite substrate 12).

In an example implementation, the identifiable marking agent 32 may be a plurality of tracer filaments 52 having a different and/or contrasting color with respect to the remaining filaments 20 of the yarn 48. When the surface 44 of the peel ply 14 is applied to the surface 24 of the composite substrate 12, a plurality of tracer filaments 52 may extend across the surface 24 in one or more directions.

The tracer filaments 52 (e.g., the identifiable marking agent 32) may define at least a portion of the surface 44 of the peel ply 14. As an example, the tracer filaments 52 may define at most 5% of the surface 44 of the peel ply 14. As another example, the tracer filaments 52 may define at most 10% of the surface 44 of the peel ply 14. As another example, the tracer filaments 52 may define at most 25% of the surface 44 of the peel ply 14. As another example, the tracer filaments 52 may define at most 50% of the surface 44 of the peel ply 14. As yet another example, the tracer filaments 52 may define 100% of the surface 44 of the peel ply 14.

Figure 7:
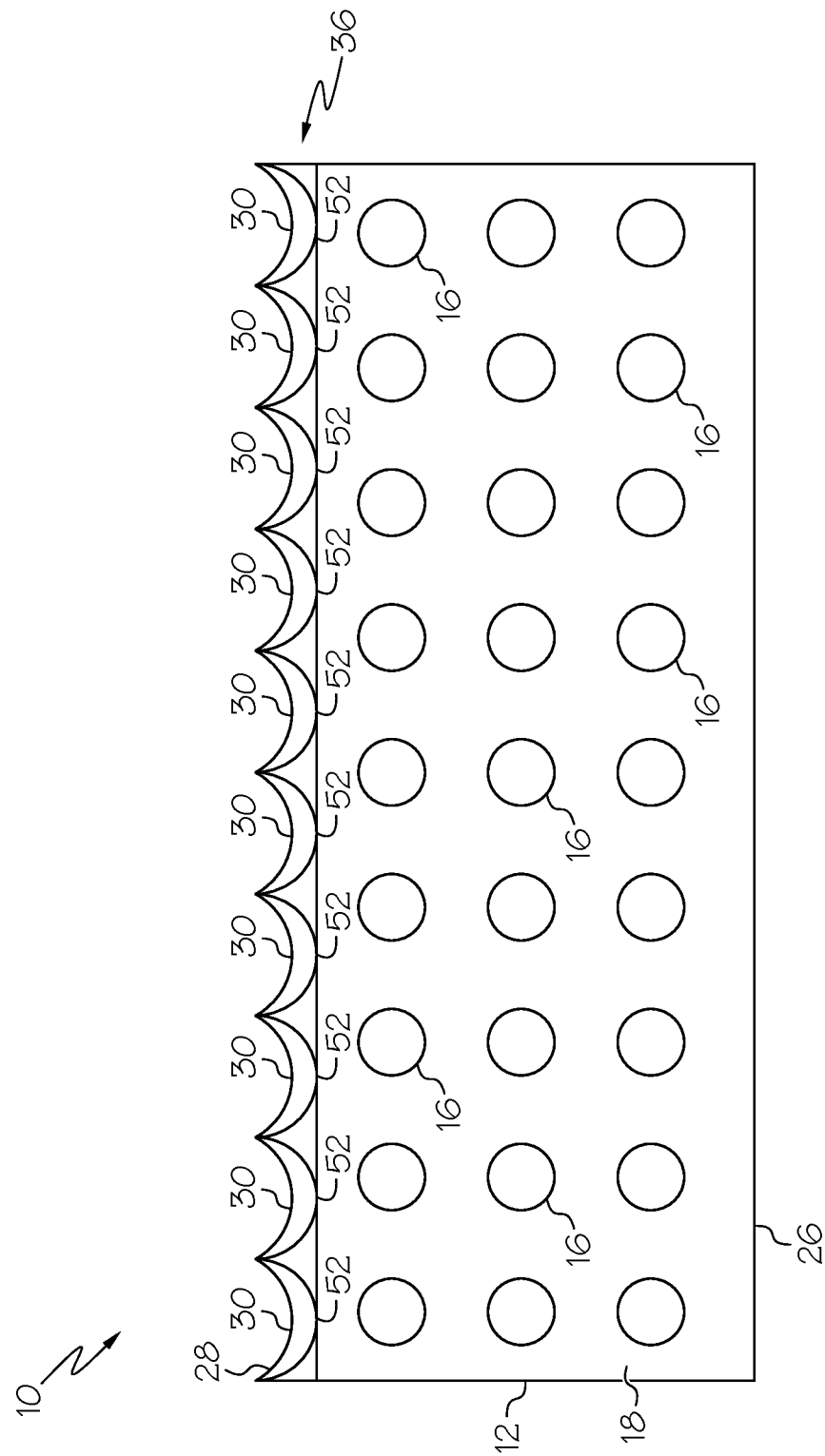
FIG. 7 is a schematic illustration of the disclosed composite structure of FIG. 6 depicting the composite substrate after removal of the peel ply.

Referring to FIG. 7, following co-curing of the composite substrate 12 and the peel ply 14 and removal of the peel ply 14 from the composite substrate 12, residue 30 from the peel ply 14 may remain on the modified surface 28 of the composite substrate 12. The residue 30 may include particles, contamination, and/or any other residue remaining (e.g., transferred) from the peel ply 14 to the modified surface 28 following removal of the peel ply 14. As an example, the residue 30 may include remnants from the tracer filaments 52. As another example, the residue 30 may include remnants from the tracer filaments 52 and residue from the filaments 20 layered on top of the tracer filaments 52 (e.g., portions of the fabric layer 38).

At least some of the identifiable marking agent 32 may also be transferred to the modified surface 28 of the composite substrate 12 along with any residue 30 upon removal of the peel ply 14. As shown in FIG. 7, the identifiable marking agent 32 is depicted as tracer filaments 52 incorporated into the peel ply 14 defining at least a portion of the surface 44. Following removal of the peel ply 14, any transferred residue 30 may be layered on top of the tracer filaments 52 (e.g., identifiable marking agent 32), thus the tracer filaments 52 may be positioned between the residue 30 and the modified surface 28. The tracer filaments 52 (e.g., the identifiable marking agent 32) may be visible on the modified surface 28 upon removal of the peel ply 14. Inspection (e.g., visual inspection) of the modified surface 28 may readily identify the existence of any residue 30 evidenced by the existence of the tracer filaments 52 (e.g., identifiable marking agent 32) or remnants of the tracer filaments 52 on the modified surface 28.

Figure 8:
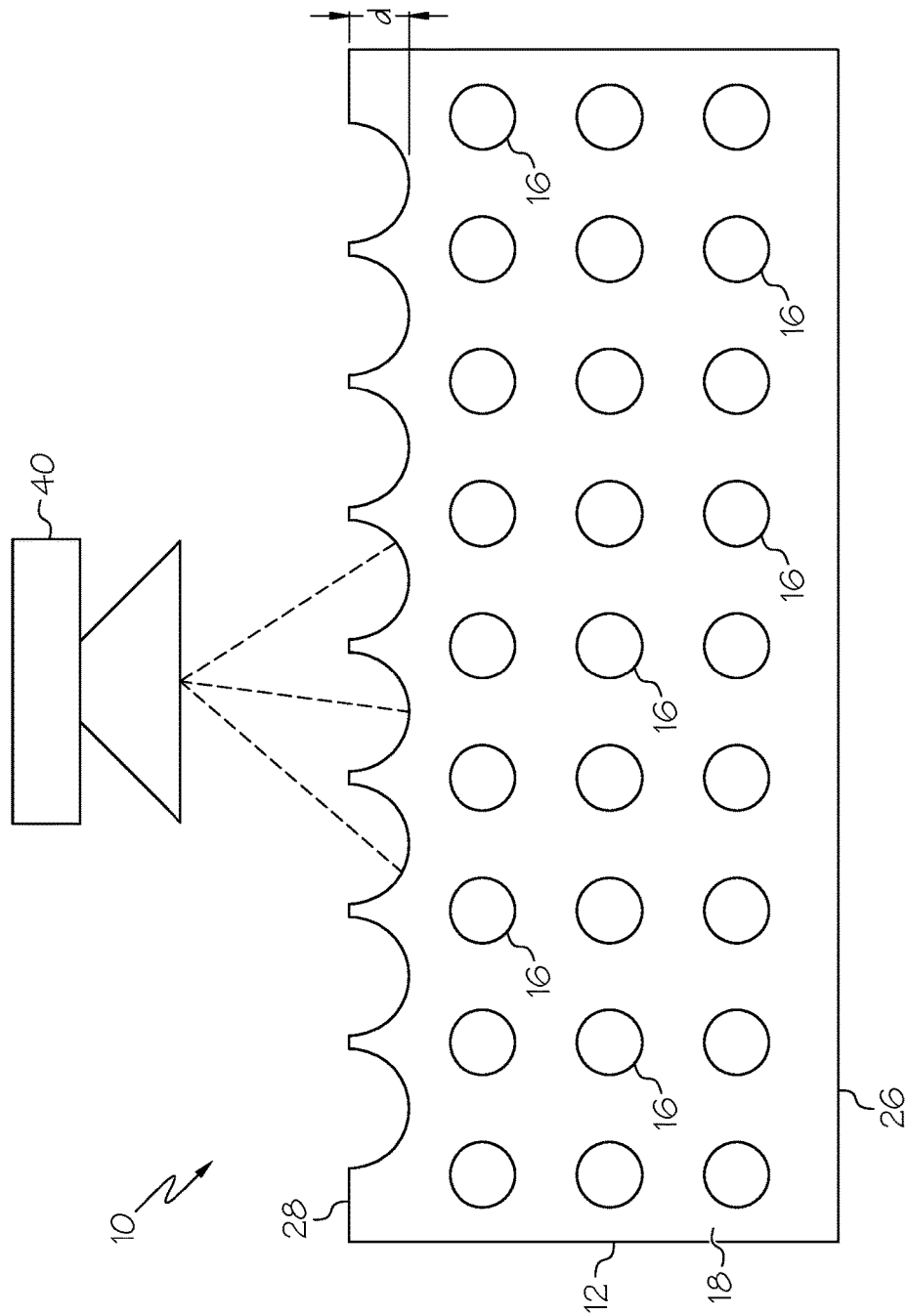
FIG. 8 is a schematic illustration of the disclosed composite structure after removal of identifiable marking agent and residue from the surface of the composite substrate.

Referring to FIG. 8, an ablation device 40 may be used to prepare the modified surface 28 of the composite substrate 12 following removal of the peel ply 14 (not shown in FIG. 8). The ablation device 40 may perform surface ablation to a depth d suitable to completely remove any residue 30 transferred from the peel ply 14 (e.g., the fabric layer 38) and remaining on the modified surface 28 of the composite substrate 12. The depth d may be defined by the depth required to completely remove the identifiable marking agent 32 (e.g., ink 54 or tracer filaments 52) visible on the modified surface 28.

Thus, surface ablation of a depth d suitable to remove substantially all of the visible identifiable marking agent 32 may provide visual evidence of removal of substantially all of the residue 30 and leave the modified surface 28 ready for bonding with a second composite substrate. The ablation device 40 may be any suitable ablation device 40, such as a plasma, laser or grit blast ablation device.

Figure 9:
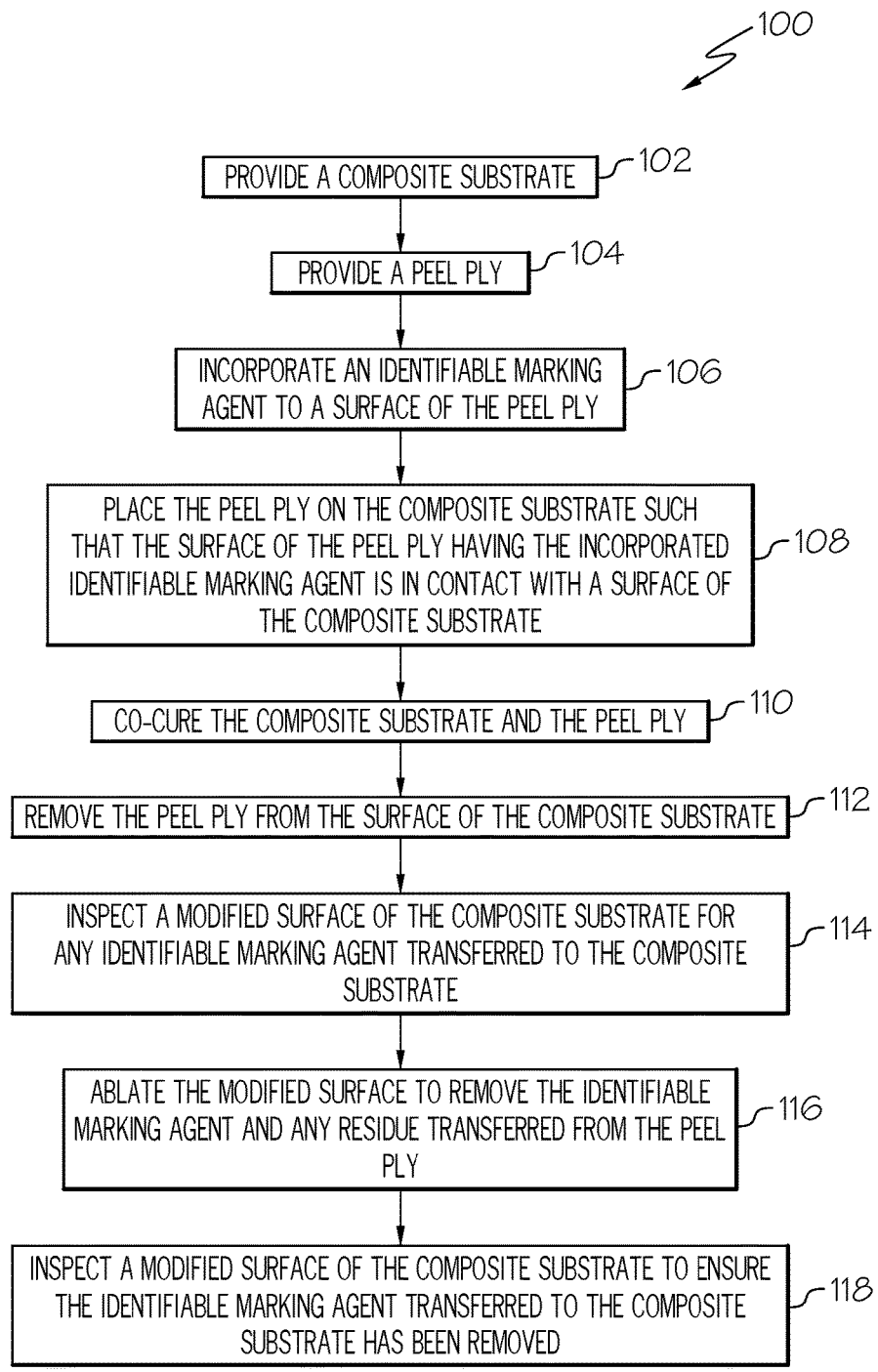
FIG. 9 is a block diagram illustrating one embodiment of the disclosed method for inspecting a pre-bond surface of a composite structure.

Referring to FIG. 9, one embodiment of the disclosed method, generally designated 100, for inspecting a pre-bond surface of a composite structure may begin at block 102 by providing a composite substrate. The composite substrate may include reinforcing fibers impregnated with a resin matrix. The composite substrate may include a surface to be prepared for bonding.

As shown at block 104, a peel ply may be provided. The peel ply may include a fiber layer. The fabric layer may include a plurality of filaments twisted and/or woven together.

As shown at block 106, an identifiable marking agent may be incorporated to a surface of the peel ply. As an example, the identifiable marking agent may be incorporated onto the surface of the fiber layer of the peel ply (e.g., ink applied onto the surface of the fabric layer). As another example, the identifiable marking agent may be incorporated into the surface of the fiber layer of the peel ply (e.g., tracer filaments woven into the fabric layer).

As shown at block 108, the peel ply may be placed on the composite substrate such that the surface of the peel ply (e.g., a surface of the fabric layer) having the incorporated identifiable marking agent is in contact with the surface of the composite substrate (e.g., the identifiable marking agent is disposed between the fabric layer and the surface of the composite substrate).

As shown at block 110, the composite substrate and the peel ply may be co-cured.

As shown at block 112, the peel ply may be removed from the composite substrate. The peel ply may be removed from the surface of the composite substrate to form a modified surface.

As shown at block 114, the modified surface of the composite substrate may be inspected to detect if any of the identifiable marking agent was transferred to the composite substrate following removal of the peel ply. For example, the modified surface of the composite substrate may be visually inspected. In an example implementation, visual inspection may be performed manually. In another example implementation, visual inspection may be performed by a machine based vision inspection system. For example, the vision inspection system may implement automated residue identification software.

Any residue transferred to the modified surface of the composite substrate may be detected (e.g., visually identified) by the existence of the identifiable marking agent on the modified surface. Thus, the identifiable marking agent may provide visible evidence of residue transferred to the modified surface following removal of the peel ply.

As shown at block 116, the modified surface may be ablated to remove the identifiable marking agent, and thus any residue transferred from the peel ply to the surface of the composite substrate. Surface ablation may be performed to a depth suitable to remove the entire identifiable marking agent from the modified surface, and thus also removing any residue disposed on top of the ink.

As shown at block 118, the modified surface of the composite substrate may be visually inspected to ensure that substantially all of the identifiable marking agent transferred to the composite substrate has been eliminated, and thus ensuring that substantially all of the residue transferred to the composite substrate has been removed.

Accordingly, the disclosed composite structure and method for preparing a composite structure for bonding may include incorporation of an identifiable marking agent to a surface of peel ply (e.g., a fabric layer of the peel ply). The identifiable marking agent may be designed to transfer to a composite substrate and be visible upon removal of the peel ply. Transfer of any residue from the peel ply that occurs during removal of the peel ply may be readily identifiable by the identifiable marking agent, thus allowing for visual inspection of the modified surface of the composite substrate to identify any residue on the surface. Surface ablation may be performed to a depth suitable to remove the identifiable marking agent (e.g., substantially all of the identifiable marking agent). Removal of the identifiable marking agent (e.g., substantially all of the identifiable marking agent) from the surface of the composite substrate may provide visual evidence that the residue (e.g., substantially all of the residue) has been removed.

Figure 10:
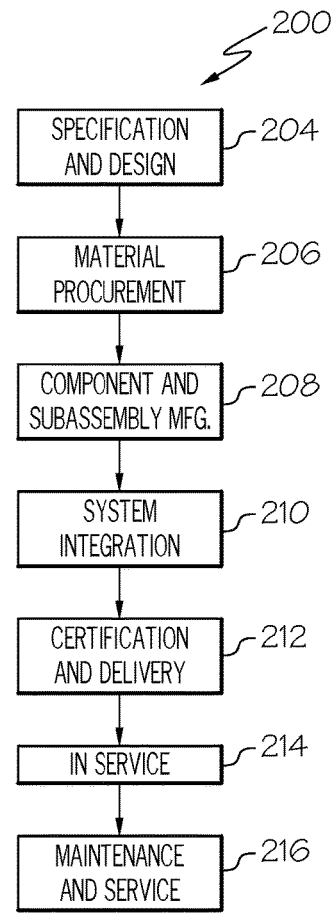
FIG. 10 is flow diagram of an aircraft production and service methodology.
Figure 11:
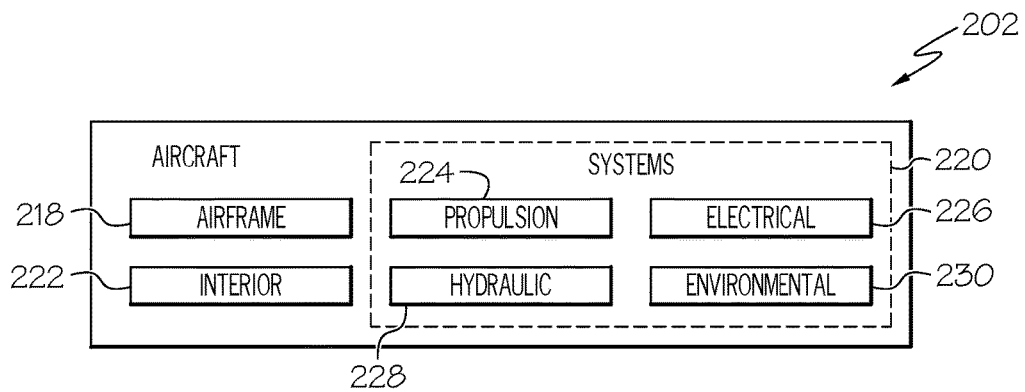
FIG. 11 is a block diagram of an aircraft.

Examples of the disclosure may be described in the context of an aircraft manufacturing and service method 200, as shown in FIG. 10, and an aircraft 202, as shown in FIG. 11. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included. Although an aerospace example is shown, the principles of the disclosed composite structure 10 and method 100 may be applied to other industries, such as the automotive industry.

Apparatus and methods embodied herein may be employed during any one or more of the stages of the production and service method 200. For example, components or subassemblies corresponding to component/subassembly manufacturing 208, system integration 210, and or maintenance and service 216 may be fabricated or manufactured using the disclosed composite structure 10 and method 100. Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218 and/or the interior 222. Similarly, one or more of apparatus examples, method examples, or a combination thereof may be utilized while the aircraft 202 is in service, for example and without limitation, to maintenance and service 216.

Although various embodiments of the disclosed composite structure and method for preparing a composite structure for bonding have been shown and described, modifications may occur to those skilled in the art upon reading the specification. The present application includes such modifications and is limited only by the scope of the claims.

What is claimed is:

1. A method for inspecting a pre-bond surface of a composite structure, said method comprising:
   placing onto a composite substrate surface of a composite substrate a peel ply comprising a peel ply surface, said peel ply surface comprising an identifiable marking agent, said composite substrate comprising a resin, wherein said peel ply surface is in contact with said composite substrate surface;
   co-curing said peel ply and said composite substrate;
   removing said peel ply from said composite substrate to form a modified surface of said composite substrate; and
   inspecting said composite substrate to determine whether said identifiable marking agent transferred to said modified surface,
   wherein said identifiable marking agent is evidence of residue transferred from said peel ply to said composite substrate.

2. The method of claim 1 comprising:
   ablating said modified surface to remove said identifiable marking agent and said residue; and
   inspecting said modified surface after said ablating step for said identifiable marking agent.

3. The method of claim 1 comprising applying said identifiable marking agent onto said peel ply surface.

4. The method of claim 3 wherein said applying step comprises applying ink onto at least a portion of said peel ply surface.

5. The method of claim 1 comprising incorporating said identifiable marking agent into said peel ply surface.

6. The method of claim 5 wherein said incorporating step comprises weaving a plurality of tracer filaments into a fabric layer of said peel ply to define at least a portion of said peel ply surface.

7. A method for preparing a pre-bond surface of a composite structure, said method comprising:
separating a peel ply, co-cured with a composite substrate, from said composite substrate, wherein said composite substrate comprises a resin; and
transferring residue and an identifiable marking agent from said peel ply to said composite substrate upon separation of said peel ply from said composite substrate,
wherein said residue of said peel ply, transferred from said peel ply to said composite substrate upon separation of said peel ply from said composite substrate, is layered on said identifiable marking agent.

8. The method of claim 7 further comprising removing said identifiable marking agent from said composite substrate, wherein removal of said identifiable marking agent from said composite substrate concurrently removes said residue of said peel ply from said composite substrate.

9. The method of claim 8 wherein said removing step comprises ablating said composite substrate to a depth sufficient to remove substantially all of said identifiable marking agent from said composite substrate.

10. The method of claim 8 further comprising inspecting said composite substrate for said identifiable marking agent, wherein said identifiable marking agent visually indicates existence of said residue of said peel ply on said composite substrate.

11. The method of claim 7 further comprising applying said identifiable marking agent onto a peel ply surface of said peel ply before said peel ply is co-cured with said composite substrate.

12. The method of claim 11 wherein:
said identifiable marking agent comprises ink; and
said applying step comprises covering at least a portion of said peel ply surface with said ink.

13. The method of claim 12 wherein said ink comprises one of a polyester resin based ink and a nylon resin based ink.

14. The method of claim 12 wherein said ink comprises one of a light activated fluorescent ink and an ultraviolet light activated ink.

15. The method of claim 7 further comprising incorporating said identifiable marking agent into a peel ply surface of said peel ply before said peel ply is co-cured with said composite substrate.

16. The method of claim 15 wherein:
said identifiable marking agent comprises tracer filaments; and
said incorporating step comprises weaving said filaments into said peel ply to form at least a portion of said peel ply surface.

17. The method of claim 7 further comprising structurally modifying a composite substrate surface of said composite substrate upon separation of said peel ply from said composite substrate.

18. The method of claim 17 wherein said structurally modifying step comprises at least one of roughening said composite substrate surface, texturing said composite substrate surface, and chemically activating said composite substrate surface.

19. The method of claim 7 wherein:
said peel ply comprises a woven fabric; and
said residue of said peel ply comprises material particles of said woven fabric.

20. The method of claim 19 wherein:
said peel ply further comprises a layer of said identifiable marking agent located on said woven fabric; and
wherein said layer of said identifiable marking agent is positioned in contact with a composite substrate surface of said composite substrate when said peel ply and said composite structure are co-cured.

* * * * *